Aug. 26, 1969     H. P. BARTON     3,463,312
TRASH SEPARATOR
Filed Dec. 4, 1967     4 Sheets-Sheet 1
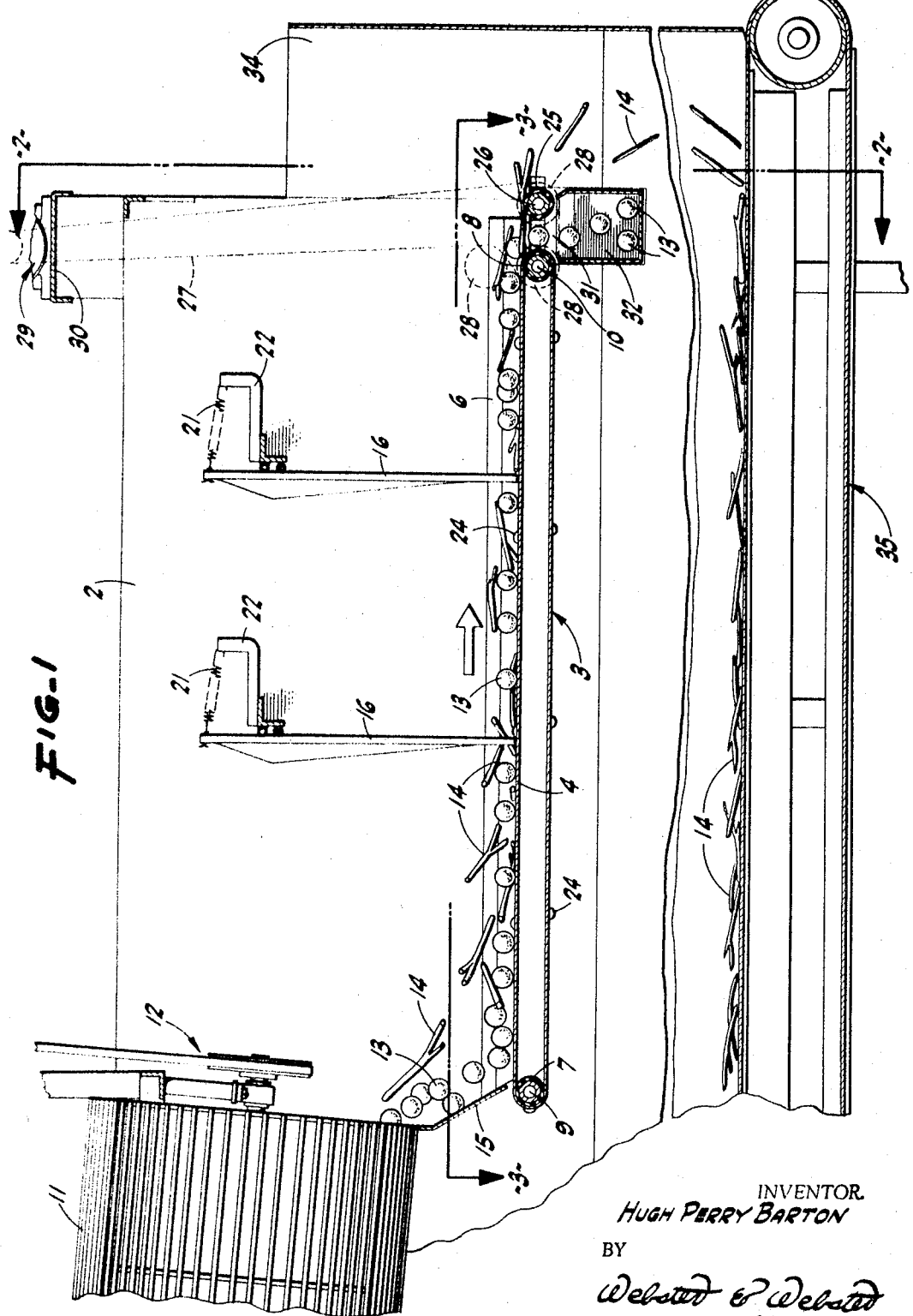
INVENTOR.
HUGH PERRY BARTON
BY
Webster & Webster
Attorneys

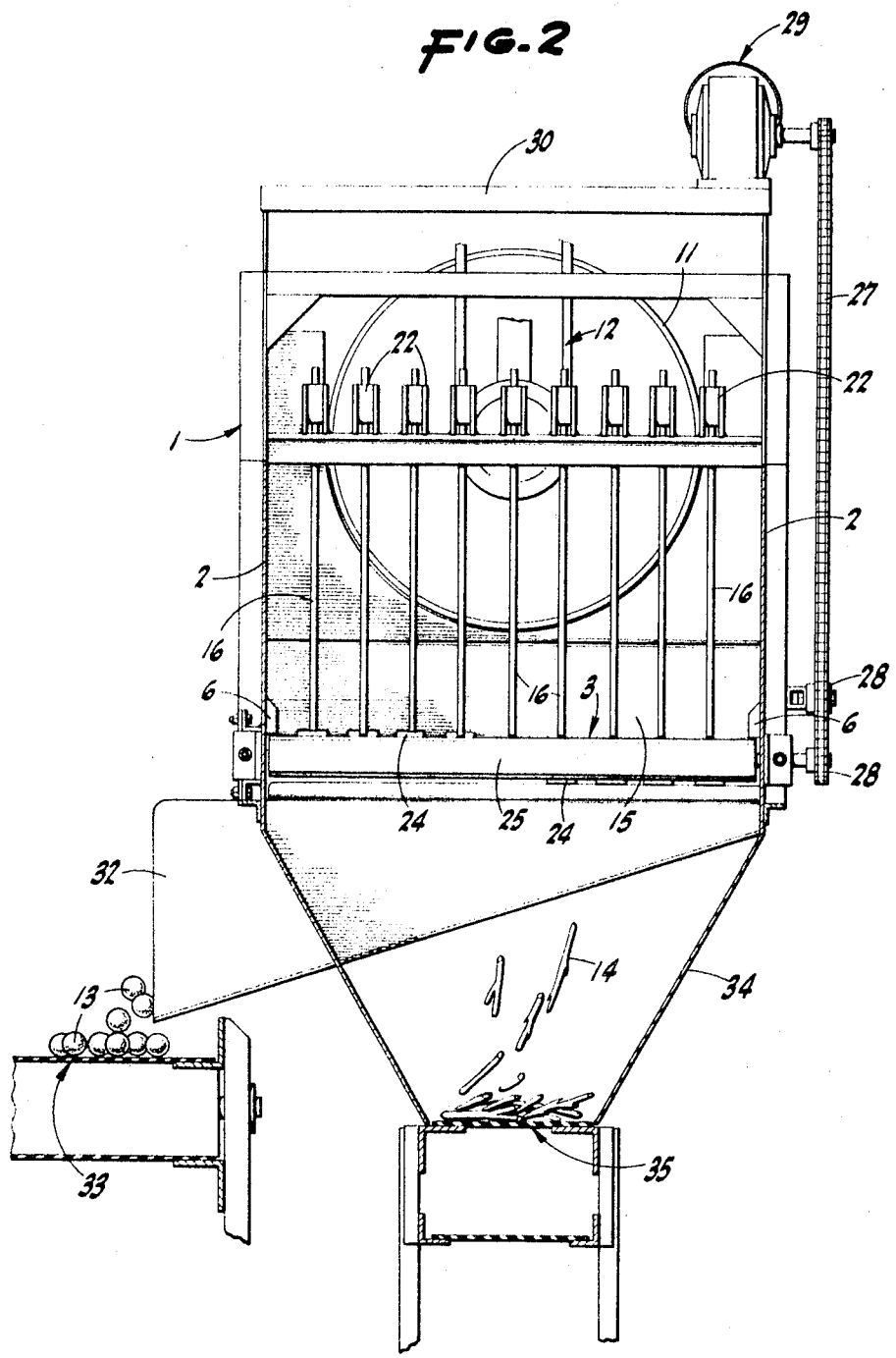

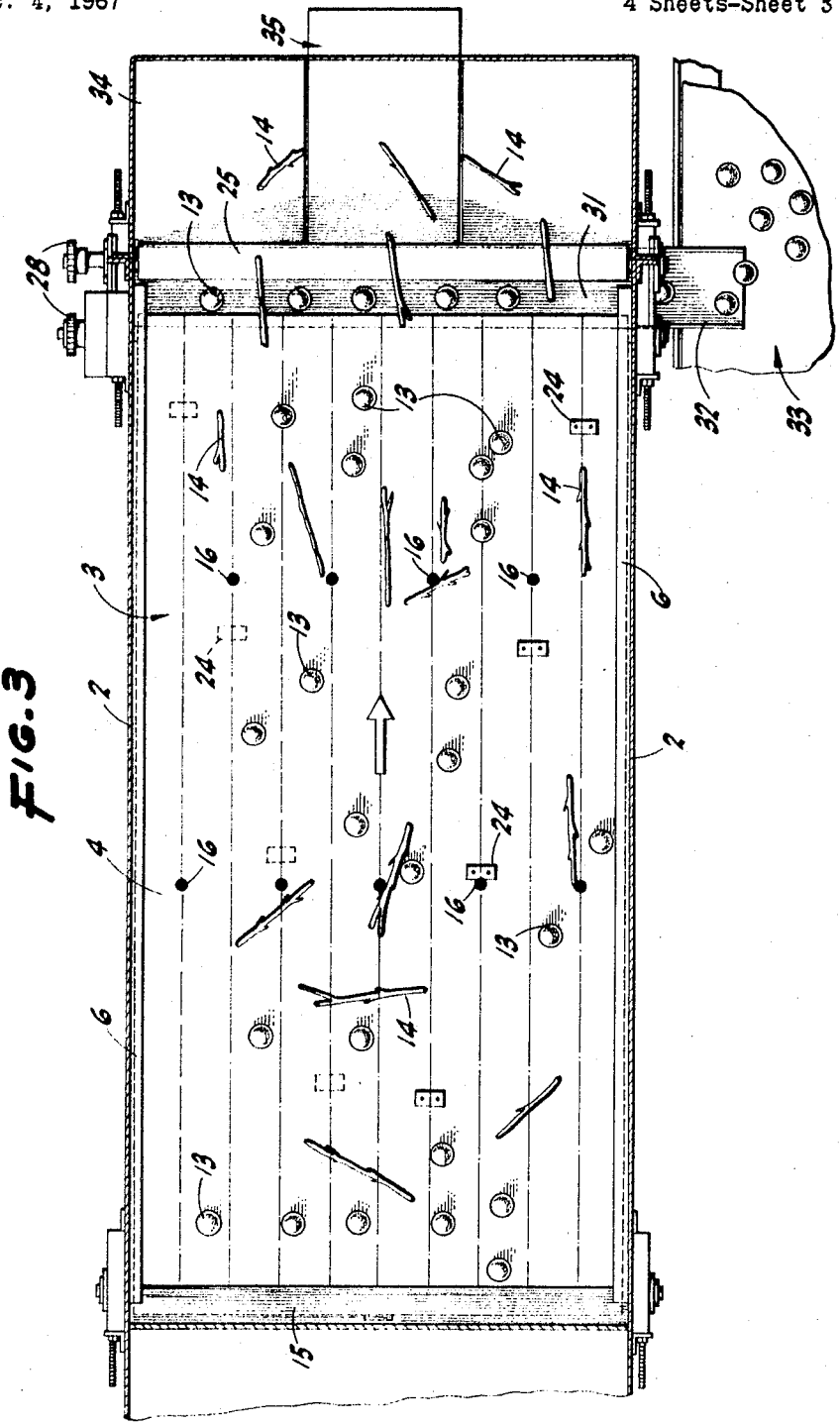

Aug. 26, 1969    H. P. BARTON    3,463,312
TRASH SEPARATOR
Filed Dec. 4, 1967    4 Sheets-Sheet 4
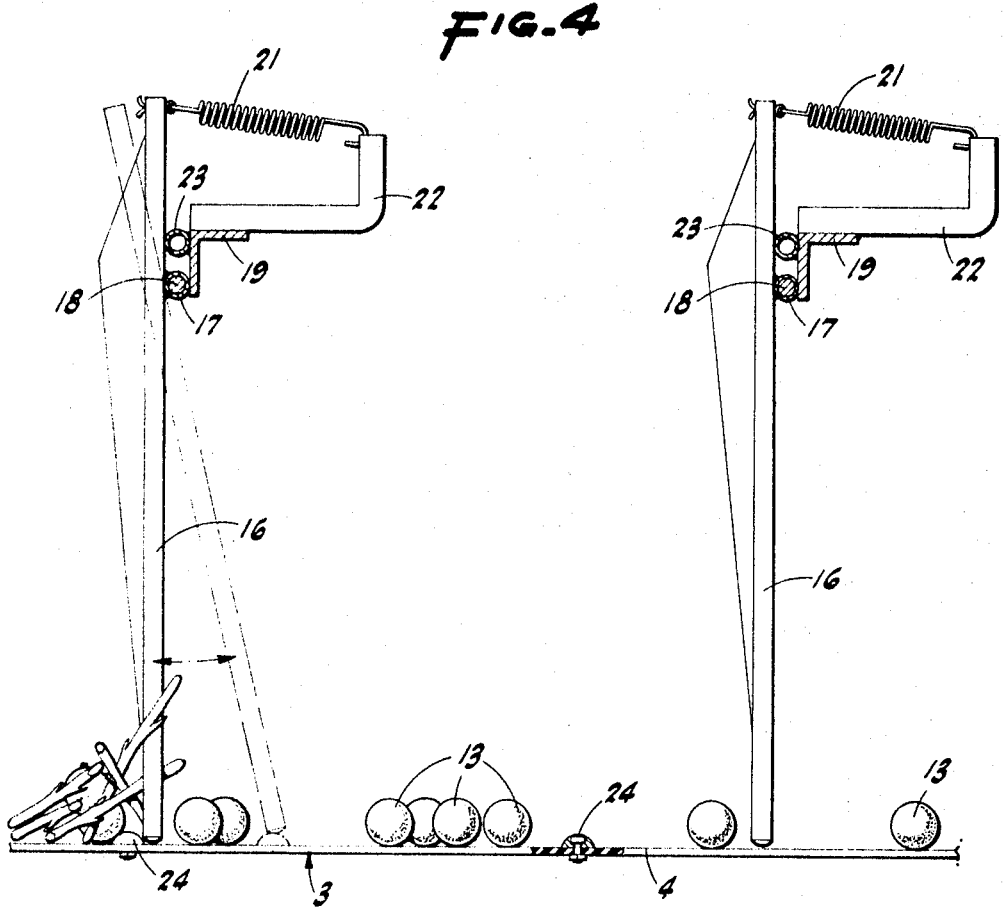
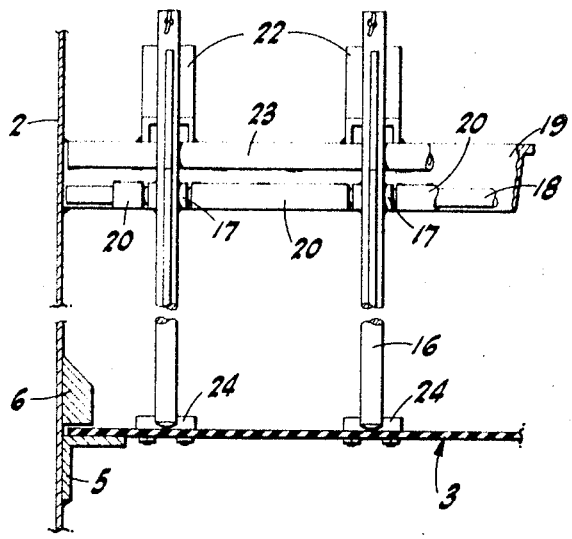

3,463,312
TRASH SEPARATOR
Hugh Perry Barton, Modesto, Calif., assignor to R. P. Barton & Company, Escalon, Calif., a corporation of California
Filed Dec. 4, 1967, Ser. No. 687,615
Int. Cl. B07b *13/02, 13/04*
U.S. Cl. 209—103                    10 Claims

ABSTRACT OF THE DISCLOSURE

A trash separator, for separating twigs from mechanically harvested nuts, comprised of an endless conveyor onto the receiving end of which the nuts—after hulling and initial cleaning but having twigs remaining intermingled therewith—are fed; there being means cooperating with the conveyor to orient the twigs so that the same extend generally lengthwise on the conveyor before reaching the discharge end thereof, and other means forming a full width but longitudinally narrow gap at said discharge end of the conveyor and through which gap the nuts downwardly gravitate while the oriented or lengthwise extending twigs are caused to span such gap and fall in a zone clear of the gravitating nuts.

BACKGROUND OF THE INVENTION

In the mechanical harvesting of nuts—such as walnuts, pecans, and almonds—it is a common practice to shake the trees to detach the nuts so that they fall upon the ground; the nuts then being gathered from the ground by a sweeper-type pick-up machine, and thereafter the nuts are passed through a hulling and initial cleaning apparatus but which permits relatively short twigs (four inches or longer) to remain intermingled with the nuts. It is to the problem of separating such twigs from the nuts (other than by hand) that the present invention is directed.

SUMMARY OF THE INVENTION

The present invention provides, as a major object, a trash separator, for separating remaining twigs from mechanically harvested nuts after hulling and initial cleaning thereof, which includes a conveyor and associated means operative to cause—at the discharge end of such conveyor—downward gravitation into separate zones of the nuts and initially intermingled twigs carried on the conveyor to said discharge end.

The present invention provides, as another object, a trash separator—for the purpose described—which comprises a driven horizontal conveyor having an upper run which moves in a predetermined direction from a receiving end to a discharge end, the intermingled nuts and twigs being fed onto the receiving end of such conveyor run and thence traveling therewith in such direction, there being means cooperating with such run intermediate its ends to orient the twigs so that they extend generally lengthwise of such run before reaching the discharge end, and other means forming a full width but longitudinally narrow gap at said discharge end whereby nuts—upon leaving the conveyor—downwardly gravitate through such gap and into one zone while the lengthwise oriented twigs are caused to span the gap and fall into a separate zone.

The present invention provides, as a further object, a trash separator, for separating twigs from mechanically harvested nuts, which is designed for ease and economy of manufacture.

The present invention provides, as a still further object, a practical, reliable, and durable trash separator, for separating twigs from mechanically harvested nuts, and one which is exceedingly effective for the purpose for which it is designed.

BRIEF DESCRIPTION OF THE DRAWINGS

FIG. 1 is a longitudinal sectional elevation of the trash separator.

FIG. 2 is a transverse sectional elevation taken on line 2—2 of FIG. 1.

FIG. 3 is a sectional plan view taken on line 3—3 of FIG. 1; the drive chain being omitted.

FIG. 4 is an enlarged, fragmentary, longitudinal sectional elevation showing certain of the fore and aft twig orienting rods and the manner of mounting the same.

FIG. 5 is an enlarged, fragmentary, transverse sectional elevation showing certain of the transversely alined twig-orienting rods.

DESCRIPTION OF THE PREFERRED EMBODIMENT

Referring now more particularly to the drawings and to the characters of reference marked thereon, the trash separator comprises an upstanding main frame 1 which is elongated and provided with relatively widely spaced side walls 2.

A full width, elongated, endless belt conveyor 3 is disposed between the side walls 2; the upper run 4 of such conveyor being supported at the edges by flanges 5 on the side walls 2, while guard boards 6 overlie such edges.

The conveyor 3 includes a rear roller 7 and a forward roller 8, and such rollers are carried on cross shafts 9 and 10, espectively, journaled on the side walls 2; the cross shaft 10, being driven (in the manner later described) so that the upper run 4 of the conveyor 3 travels in a forward direction.

A conventional rotary cleaner 11, here shown as of squirrel-cage type and driven as at 12, is arranged with the present apparatus in a manner to deliver intermingled nuts 13 and twigs 14 onto the receiving end of the upper run 4 of conveyor 3; there being a slide 15 which assures that no nuts nor twigs fall to the rear of the conveyor.

Intermediate the ends of the conveyor 3 the following twig-orienting means is provided:

Longitudinally spaced fore-and-aft rows of normally vertical, transversely spaced, twig-orienting rods 16 are disposed so that the lower ends of such rods are immediately adjacent the upper run 4 of the conveyor; the rods of one such row being transversely staggered relative to the rods of the other row; i.e. are not in alinement in the direction of travel of such upper run 4.

The upper end portions of the rods 16 of each row are pivoted by means of sleeves 17 carried on a cross shaft 18 attached to a cross bar 19 extending between the side walls 2. As so pivoted, the rods 16 are capable of swinging forward at their lower ends and from the normally vertical position of such rods. Spacer sleeves 20 maintain the pivot sleeves 17 in proper position.

An upper end portion of each rod 16 is disposed above the related cross bar 19, and a tension spring 21 is connected to the upper end of such rod and thence extends forward to connection with the upper end of a dog-leg bracket 22 secured on and projecting forward from such cross bar. Each spring 21 always urges the corresponding rod 16 forward at the upper end and rearward at the lower end but is prevented from swinging the lower part of the rod rearward beyond vertical; this latter result being attained by a stop 23 on the backside of cross bar 19 above the cross shaft 18. Each rod 16 can, nevertheless, swing forward at its lower end and against the tension of the spring 21.

As the nuts 13 and twigs 14 move forward with the upper run 4 of conveyor 3, any twig which is not extending generally lengthwise of the direction of travel is automatically oriented to such lengthwise position before reaching the discharge end of the conveyor. This result is attained by the rods 16; any twig which lies in a transverse position ultimately moving against one of such rods and as such a twig is in almost every instance rod-engaged other than dead-center between its ends, the twig—with continued forward movement—pivots or rocks about the rod and assumes a generally lengthwise position. Thus, as the twigs reach the discharge end of the conveyor, they all extend in a generally lengthwise direction and which is for the purpose later described.

Should any transversely extending twig engage dead-center against a rod 16 or a branched twig hook thereon or there be a pile-up of twigs against a rod, such twig (or twigs) is shortly released from the rod, by reason of the latter being swung forward at the lower end (against the tension of the related spring 21) and then released to snap back and kick the engaged twig (or twigs) free. Such forward swinging and release of the lower end of each rod is accomplished by means of trigger blocks 24 secured on the outer face of the conveyor 3. Such trigger blocks 24 are of a number and disposed so that—each time when moving with the upper run 4—a block will engage each rod 16 at its lower end and swing the same forward; the rod—as the run 4 continues to travel—riding in escaping relation relatively rearwardly over the block and then snapping back to vertical. See FIG. 4 and particularly the rod 16 to the left of the view.

A separate, full-width roller 25 is disposed in adjacent but spaced relation ahead of the discharge end of the conveyor 3, and such separate roller—the top of which is in substantially the plane of the upper run 4—includes a transverse shaft 26 journaled on the side walls 2. The shafts 10 and 26 of the rollers 8 and 25, respectively, project beyond one side wall 2 and are driven in unison, so that the separate roller 25 turns forward at the top and thus in the same direction as the upper run 4 travels, by means of an endless chain 27 suitably trained about sprockets 28 on the projecting ends of said shafts 10 and 26. From the sprockets 28, the endless chain 27 extends upward to, and is driven by, an electric motor and gear head unit 29 mounted on a top cross bar 30.

The separate, transverse-axis roller 25 is spaced ahead of the discharge end of conveyor 3 a distance to form a gap 31 only slightly greater in dimension (longitudinally of the apparatus) than the maximum diameter of the nuts 13 to be separated from the twigs 14.

As the nuts 13 reach the discharge end of the conveyor 3 and deliver therefrom, they alone downwardly gravitate through the gap 31, whence they are received in a transverse chute 32 which feeds the nuts to a carry-off conveyor 33.

While the nuts 13 drop through the gap 31, the lengthwise extending twigs 14 do not do so but rather span such gap from the discharge end of the conveyor 3 and thence deliver over the separate roller 25 and downwardly gravitate therebeyond into a hopper 34 which feeds the twigs to another carry-off conveyor 35. The speed of the conveyor 3 is such that while the nuts are not thrown across the gap 31 but fall therethrough, the twigs have sufficient impetus, aided by the frictional action of roller 25, to carry over such gap and the roller 25 and descend therebeyond. In this fashion, therefore, an effective separation of the initially intermingled nuts and twigs is accomplished rapidly and effectively; the apparatus having substantial capacity, working smoothly, and requiring a minimum of servicing or repair.

From the foregoing description, it will be readily seen that there has been produced such a trash separator, for separating twigs from mechanically harvested nuts, as substantially fulfills the objects of the invention, as set forth herein.

While this specification sets forth in detail the present and preferred construction of the trash separator, for separating twigs from mechanically harvested nuts, still in practice such deviations from such detail may be resorted to as do not form a departure from the spirit of the invention.

I claim:

1. A trash separator for separating intermingled nuts and twigs comprising, on a frame, a driven endless conveyor having a receiving end and a discharge end, the intermingled nuts and twigs being fed onto the receiving end of the conveyor, frame-supported means cooperating with the conveyor intermediate said receiving and discharge ends thereof operative to engage and orient to a lengthwise position the twigs moving with the conveyor, and a frame-supported member disposed in adjacent but spaced relation beyond said discharge end and forming therewith a transversely extending, longitudinally narrow gap dimensioned so that nuts delivered from the discharge end of the conveyor downwardly gravitate through the gap while the twigs span said gap from such discharge end of the conveyor and thence deliver over said member and downwardly gravitate therebeyond.

2. A trash separator, as in claim 1, including a chute into which the nuts fall below the gap, a carry-off conveyor to which the nuts are fed by the chute, a hopper into which the twigs fall beyond said member, and another carry-off conveyor to which the twigs are fed by the hopper.

3. A trash separator, as in claim 1, in which said member is a separate full-width roller, and means driving such roller so that it turn at the top in a direction away from the discharge end of the conveyor.

4. A trash separator, as in claim 3, in which the conveyor includes an upper run, and the top of said separate conveyor is disposed in substantially the plane of such upper run.

5. A trash separator, as in claim 3, in which the drive means actuates the separate roller and the conveyor in unison.

6. A trash separator, as in claim 1, in which the twig-orienting means comprises a plurality of depending rods, the conveyor of endless-belt type and including a forwardly moving upper run, and the rods terminating at their lower ends immediately adjacent said upper run and in the path of twigs moving forward on said conveyor run.

7. A trash separator, as in claim 6, in which there are fore and aft transverse rows of such rods; the rods of such rows being transversely staggered relative to each other.

8. A trash separator, as in claim 6, in which each rod is pivoted above its lower end for forward swinging thereof from a substantially vertical normal position of the rod, a spring connected to each rod and yieldably resisting such forward swinging thereof, and trigger blocks on the conveyor operative when moving in said upper run to engage the lower ends of the rods and swing the same forward, whereupon said lower ends of the rods escape the blocks and the same snap back to said normal position.

9. A trash separator, as in claim 8, in which the springs are of tension type and are connected to and project forward from the rods above the pivotal axes thereof; there being a stop positioned to prevent the springs from swinging the rods beyond said normal position.

10. A trash separator, as in claim 6, in which the rods are mounted for individual, spring resisted, forward swinging at their lower ends, and trigger means on the conveyor operative, when moving in the upper run thereof, to engage the lower ends of the rods and so swing the same; said trigger means, upon continued forward movement, releasing the rods for snap-back action.

References Cited

UNITED STATES PATENTS 1,600,037  9/1926  Bullard _____ 209—192 X
3,217,878  11/1965  Rood _____ 209—78

M. HENSON WOOD, Jr., Primary Examiner

R. A. SCHACHER, Assistant Examiner